United States Patent [19]

Tsuruga et al.

[11] 4,367,375
[45] Jan. 4, 1983

[54] PUSH-BUTTON DIAL CIRCUIT

[75] Inventors: Yuuji Tsuruga, Mitaka; Akihiro Kobayashi, Yokohama; Makoto Yoshitoshi; Yutaka Nishino, both of Yokosuka, all of Japan

[73] Assignees: Iwasaki Tsushinki Kabushiki Kaisha; Nippon Telegraph and Telephone Public Corporation, both of Japan

[21] Appl. No.: 186,579

[22] Filed: Sep. 12, 1980

[30] Foreign Application Priority Data

Sep. 14, 1979 [JP] Japan .................................. 54-117340

[51] Int. Cl.³ .............................................. H04M 1/00
[52] U.S. Cl. .............................. 179/81 R; 179/84 VF
[58] Field of Search ............ 179/81 R, 81 A, 84 VF, 179/16 F, 77, 90 K

[56] References Cited

U.S. PATENT DOCUMENTS 3,916,114 10/1975 Persson ........................... 179/81 R
3,989,902 11/1976 Cowpland ....................... 179/81 R Primary Examiner—Joseph A. Popek
Attorney, Agent, or Firm—Robert E. Burns; Emmanuel J. Lobato; Bruce L. Adams

[57] ABSTRACT

A push-button dial circuit having a low DC resistance and a high output impedance. An oscillator for generating a multi-tone dial signal is connected through a buffer transistor to terminals for coupling the multi-tone dial signal to a subscriber's line. The terminals also supply a DC power source current to the dial circuit. A constant voltage circuit is connected to the oscillator to stabilize the DC current supplied to the oscillator, and a reactance transistor circuit is connected between the terminals and the oscillator for defining a DC supply path from the terminals through the reactance transistor circuit to the oscillator. The reactance transistor circuit includes a transistor having a capacitor and a resistor respectfully connected across the base-emitter path and across the base-collector path of the transistor.

1 Claim, 6 Drawing Figures

PUSH-BUTTON DIAL CIRCUIT

BACKGROUND OF THE INVENTION

1. Field of the Invention

The present invention relates to a push-button dial circuit for a push-button telephone set.

2. Description of the Prior Art

Since a dial circuit used in each of conventional push-button telephone sets for generating a multi-tone dial signal is, in principles, composed of a buffer transistor and a resistor connected in parallel thereto, the AC impedance of the dial circuit is substantially equal to the value of the parallel resistor due to a high AC impedance of the buffer transistor, and the DC resistance of the dial circuit is provided in the form of a combined resistance of the respective resistances of the buffer transistor and the parallel resistor.

Incidentally, the push-button dial circuit operates by a power source current supplied from the central office; therefore, in order to ensure its stable operation even in a case of a long subscriber's line, the push-button dial circuit is required to operate at a low voltage and its DC resistance must be small in value. On the other hand, the AC impedance of the push-button dial is required to have a large value for sending out a dial signal at a proper level.

In conventional push-button dial circuits, since the AC impedance and the DC resistance are determined by the resistor connected in parallel with the buffer transistor as described above, there is such a shorcoming that an increase in the AC impedance causes an increase in the DC resistance, whereas a decrease in the DC resistance causes a decrease in the AC impedance. Further, the AC impedance depends on the resistance value of the resistor connected in parallel to the buffer transistor and assumes a constance value irrespective of the length of the subscriber's line, with the result that the output signal from the dial circuit is also sent out at a constant level.

On the other hand, since the subscriber's line has an AC loss substantially determined by the line length, the level of the dial signal reaching the central office comes to have a value obtained by subtracting the AC loss of the subscriber's line from the output signal level of the dial circuit. In practice, since the loss of the subscriber's line is large, use is made of a manual or automatic signal level control circuit in the prior art push-button dial circuit for controlling the signal level in a case of a short-distance line, but in a case of a long-distance line, the signal level is not controlled, whereby the range of the level of the signal reaching the central office is made narrower than the range of loss of the subscriber's line.

SUMMARY OF THE INVENTION

An object of this invention is to provide a push-button dial circuit, which has a low DC resistance and a high AC impedance and is adapted so that the AC impedance varies with a DC current value.

In accordance with the present invention, there is provided a push-button dial circuit in which a low DC resistance and a high output impedance are obtained by using a reactance transistor in place of the resistor connected in parallel to the buffer transistor in the prior art push-button dial circuit and in which the levels of the signals reaching the central office are held substantially constant irrespective of subscriber's line lengths without employing the signal level control circuit.

BRIEF DESCRIPTION OF THE DRAWINGS

The principle, construction and operation of this invention will be clearly understood from the following detailed description taken in conjunction with the accompanying drawings, in which.

Figure 1A:
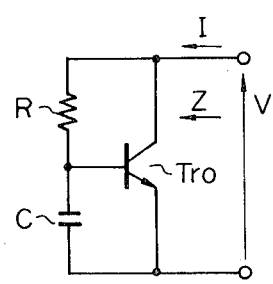
FIGS. 1A and 1B are diagrams respectively illustrating the basic construction of a reactance transistor for use in the present invention and its specific circuit arrangement.
Figure 1B:
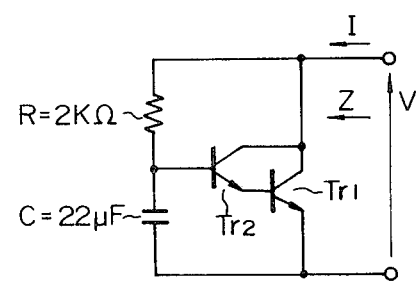
Figure 2:
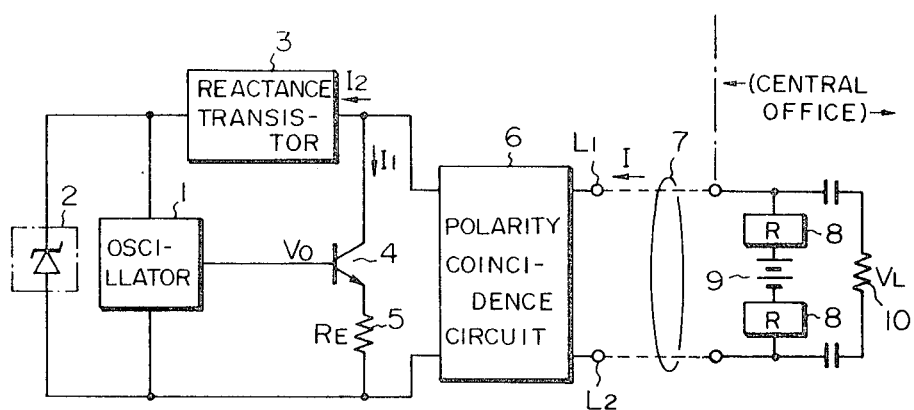
Figure 3:
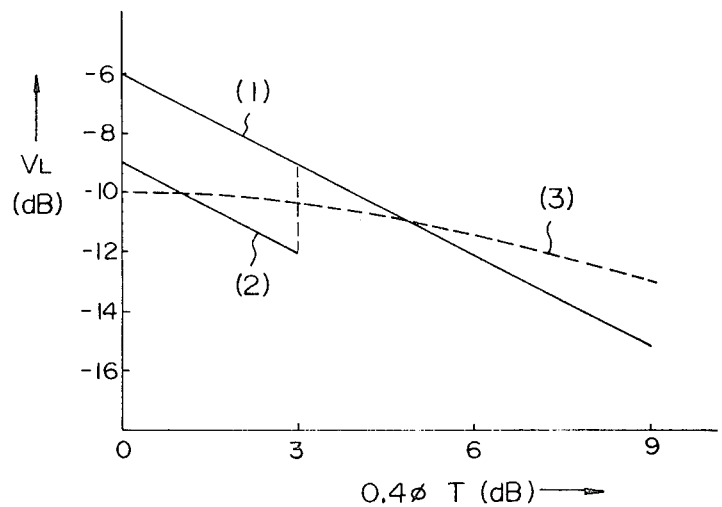

FIGA. 1C and 1D are characteristic diagrams showing the characteristics of the circuit arrangement of FIG. 1B;

FIG. 2 is a circuit diagram illustrating an embodiment of the present invention; and FIG. 3 is a characteristic diagram showing the characteristics of subscriber lines in terms of the level of a signal reaching a central office in cases of a conventional push-button dial circuit and a push-button dial circuit of the preset invention.

DETAILED DESCRIPTION

With reference to FIGS. 1A and 1B illustrating, respectively, the basic construction of the reactance transistor and its specific circuit arrangement, reference character R indicates a resistor; C designates a capacitor, $Tr_0$, $Tr_1$ and $Tr_2$ identify transistors; Z denotes an AC impedance; I represents a DC current; and V shows a terminal DC voltage. Accordingly, in FIG. 1A the transistor $Tr_0$, the resistor R, and the capacitor C make up the reactance transistor, and in FIG. 1B the transistors $Tr_1$ and $Tr_2$, the resistors R and the capacitor C constitute a reactance transistor.

Figure 1C:
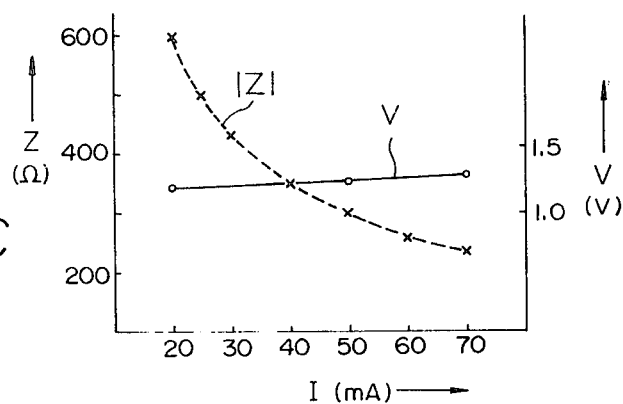
Figure 1D:
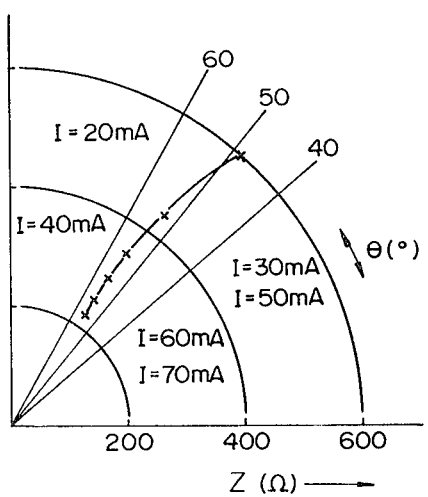

FIG. 1C is a characteristic diagram of the specific circuit arrangement of FIG. 1A, showing the absolute value $|Z|$ of the AC impedance and the DC voltage V relative to the DC current I. FIG. 1D is a characteristic diagram of the specific circuit arrangement of FIG. 1B, showing the absolute value $|Z|$ of the AC impedance and a phase angle $\theta$ relative to the DC current I.

FIG. 1C shows that a decrease in the DC current of the reactance transistor causes an increase in the absolute value $|Z|$ of the AC impedance, that the DC voltage V assumes a substantially constant value in the range of 1.3 to 1.2 V and that the DC resistance therefore becomes ten to dozens of ohm and far smaller than the AC impedance Z. It will be seen from FIG. 1D that the reactance transistor has an inductive impedance. By suitable selection of the values of the capacitor C and the resistor R in FIG. 1B, the characteristics shown in FIGS. 1C and 1D can be varied. The reason why the DC current I is limited specifically to the range of 20 to 70 mA is that the current range of operation of the push-button dial circuit corresponds to the above range.

FIG. 2 is a circuit diagram illustrating an embodiment of the present invention. In FIG. 2, the circuit at the left side of terminals $L_1$ and $L_2$ is a push-button dial circuit. Reference numeral 1 indicates an oscillator; 2 designates a constant-voltage circuit; 3 identifies a reactance transistor; 4 denotes a buffer transistor; 5 represents an emitter resistor; and 6 shows a polarity coincidence circuit comprising a bridge rectifier. At the right side of the terminals $L_1$ and $L_2$, reference numeral 7 indicates a subscriber's line; 8 designates intra-office relays; 9 identifies a central office power source; and 10 denotes a resistor of a central office receiver.

A description will be given of the operation of the above embodiment. The output signal $V_0$ of the oscillator 1 is amplified by the reactance transistor 3, the buffer transistor 4 and the emitter resistor 5 to provide $v_0+20 \log (Z/R_E)[dB]$ across the terminals $L_1$ and $L_2$, and the level of the signal reaching the central office, $v_L$, becomes such that $v_L = v_0 + 20 \log (Z/R_E) - T[dB]$ which is a value obtained by subtracting the line loss T of the subscriber's line from the abovesaid value. The line loss T increases with an increase in the length of the subscriber's line and, at the same time, the DC resistance of the subscriber's circuit also increases.

Next, in the dial circuit the line current (DC current) I is divided into a current $I_1$ of the buffer transistor 4 and a current $I_2$ of the reactance transistor 3. Since the oscillator 1 is driven by the constant-voltage circuit 2 at a constant voltage, the current $I_1$ of the buffer transistor 4 remains constant even if the line current I varies, resulting in the current $I_2$ of the reactance transistor 3 undergoing a change equal to the variation value of the line current I. The change in the current $I_2$ causes a change in the impedance Z of the reactance transistor 3, changing the sentout signal level across the terminals $L_1$ and $L_2$. However, since the variation value of the current $I_2$ is equal to the variation value of the current I, the line loss T of the subscriber's line is also varied. Assuming that in case of $I=I_a$, $T=T_a$, $I_2=I_{2a}$ and $Z=Z_a$ and that in case of $I=I_b$, $T=T_b$, $I_2=I_{2b}$ and $Z=Z_b$, the levels of signals reaching the central office receiver, $v_{La}$ and $v_{Lb}$, in the cases of $I_a$ and $I_b$ are as follows:

$$v_{La} = v_0 + 20 \log (Z_a/R_E) - T_a[dB]$$

$$v_{Lb} = v_0 + 20 \log (Z_b/R_E) - T_b[dB]$$

Accordingly, a variation value $\Delta v_L$ of the signal level caused by changing the line current I from $I_a$ to $I_b$ is as follows:

$$\Delta v_L = v_{La} - v_{Lb}$$
$$= 20 \log (Z_a/Z_b) + (T_b - T_a) [dB]$$

If $I_a > I_b$, it follows that $Z_a > Z_b$ and that $T_b > T_a$. Accordingly, the variation value $20 \log (Z_a/Z_b)$ of the signal level by the impedance change of the reactance transistor 3 and the variation value $(T_b - T_a)$ of the line loss by the subscriber's line tend to cancel each other. Therefore, by suitable selection of the values of the capacitor C and the resistor R in the reactance transistor in FIG. 1B, the level $v_L$ of the signal reaching the central office receiver can be held substantially constant irrespective of the length of the subscriber's line.

FIG. 3 is a graph showing subscriber's line characteristics in terms of the level of a signal reaching the central office in cases of using the conventional push-button dial circuit and the push-button dial of the present invention. In FIG. 3, (1) indicates the characteristic in a case of the conventional dial circuit without using the signal level control circuit, (2) the characteristic in a case of the conventional dial circuit using the signal level control circuit and (3) the characteristic of the dial circuit of the present invention. Furthermore, the requirements of the low DC resistance and high impedance for the push-button dial circuit are also satisfied by the present invention.

As has been described above in detail, a reactance transistor is used in a push-button dial circuit in accordance with this invention, by which a low DC resistance and a high AC impedance are provided in the dial circuit so that the dialling operation for a long-distance line is made possible; moreover, by utilizing the fact that the impedance of the reactance transistor increases with a decrease in the DC current, the signal level can be controlled without the necessity of a special control circuit therefor.

What we claim is:
1. A push-button dial circuit comprising:
   terminal means for supplying a DC power source current to the dial circuit and for coupling a multi-tone dial signal to a subscriber's line;
   an oscillator for generating the multi-tone dial signal;
   a constant-voltage circuit connected to the oscillator to stabilize the DC current supplied from the terminal means to the oscillator;
   a buffer transistor circuit having its collector-emitter path connected across the terminal means and having its base connected to the output of the oscillator for amplifying the multi-tone dial signal and for coupling the amplified multi-tone dial signal to the terminal means; and
   a reactance transistor circuit including at least one reactance transistor and having a capacitor and a resistor respectively connected across the base-emitter path and across the base-collector path of the reactance transistor, the emitter-collector path of the reactance transistor being connected between the terminal means and the oscillator for defining a DC supply path from the terminal means through the reactance transistor circuit to the oscillator.

* * * * *